United States Patent
Langford et al.

(10) Patent No.: US 10,190,438 B2
(45) Date of Patent: Jan. 29, 2019

(54) TURBINE ENGINE AND CONTROL METHOD

(71) Applicant: TURBOMECA, Bordes (FR)

(72) Inventors: Stephen Langford, Pau (FR); Fabien Lescher, Aressy (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 330 days.

(21) Appl. No.: 15/037,374

(22) PCT Filed: Nov. 7, 2014

(86) PCT No.: PCT/FR2014/052849
§ 371 (c)(1),
(2) Date: May 18, 2016

(87) PCT Pub. No.: WO2015/075346
PCT Pub. Date: May 28, 2015

(65) Prior Publication Data
US 2016/0298486 A1  Oct. 13, 2016

(30) Foreign Application Priority Data

Nov. 19, 2013 (FR) ...................... 13 61353

(51) Int. Cl.
F01D 21/02 (2006.01)
F02C 3/10 (2006.01)
F02C 9/46 (2006.01)

(52) U.S. Cl.
CPC ................ *F01D 21/02* (2013.01); *F02C 3/10* (2013.01); *F02C 9/46* (2013.01);
(Continued)

(58) Field of Classification Search
CPC ...... F02C 9/26; F02C 9/28; F02C 9/38; F02C 9/46; F01D 21/00; F01D 21/06;
(Continued)

(56) References Cited

U.S. PATENT DOCUMENTS 3,614,457 A * 10/1971 Eggenberger ........... F01D 17/26
290/40 R
4,998,949 A * 3/1991 Cantwell ................... F02C 9/28
60/39.281
(Continued)

FOREIGN PATENT DOCUMENTS

| EP | 2 570 617 A1 | 3/2013 |
| GB | 2 214 331 A | 8/1989 |
| WO | WO 2012/001334 A1 | 1/2012 |

OTHER PUBLICATIONS

International Search Report as issued in International Patent Application No. PCT/FR2014/052849, dated Mar. 5, 2015.

*Primary Examiner* — Andrew Nguyen
*Assistant Examiner* — Stephanie Cheng
(74) *Attorney, Agent, or Firm* — Pillsbury Winthrop Shaw Pittman LLP

(57) ABSTRACT

A turbine engine includes a compressor, a combustion chamber, first and second turbines downstream from the combustion chamber, a first rotary shaft constrained to rotate at least with the compressor and the first turbine, a second rotary shaft constrained to rotate with the second turbine, the second rotary shaft nevertheless being free to rotate relative to the first rotary shaft, and a regulator for controlling the feed of fuel to the combustion chamber. The regulator cuts off the feed of fuel to the combustion chamber if the speed of rotation of the second rotary shaft exceeds a maximum threshold that varies as a function of at least one indicative physical parameter associated with mechanical power being (Continued)

extracted from the combustion gas by the second turbine. A method of regulating the turbine engine is also presented.

13 Claims, 2 Drawing Sheets

(52) U.S. Cl.
CPC .. *F05D 2220/329* (2013.01); *F05D 2270/021* (2013.01); *F05D 2270/09* (2013.01); *F05D 2270/091* (2013.01); *F05D 2270/80* (2013.01); *Y02T 50/671* (2013.01)

(58) Field of Classification Search
CPC ................ F01D 21/02; F05D 2270/02; F05D 2270/023; F05D 2270/091; F05D 2270/021; F05D 2270/03
See application file for complete search history.

(56) References Cited

U.S. PATENT DOCUMENTS

| | | | |
|---|---|---|---|
| 6,321,525 B1 | 11/2001 | Rogers | |
| 2016/0090187 A1* | 3/2016 | Certain | ................ B64D 27/10 60/773 |

* cited by examiner

TURBINE ENGINE AND CONTROL METHOD

CROSS-REFERENCE TO RELATED APPLICATIONS

This application is the U.S. National Stage of PCT/FR2014/052849, filed Nov. 7, 2014, which in turn claims priority to French Patent Application number 1361353, filed Nov. 19, 2013. The content of these applications are incorporated herein by reference in their entireties.

BACKGROUND OF THE INVENTION

The present invention relates to the field of turbine engines and to regulating them.

The term "turbine engine" is used in the present context to designate any machine for converting heat energy from a working fluid into mechanical energy by expanding said working fluid in a turbine. More particularly, the working fluid may be a combustion gas resulting from a combustion chemical reaction with air in a combustion chamber, after the air has been compressed in a compressor that is driven by the turbine via a first rotary shaft. Thus, turbine engines, as understood in the present context, comprise bypass or non-bypass turbojets, turboprops, turboshaft engines, and gas turbines, amongst others. In the description below, the terms "upstream" and "downstream" are defined relative to the normal flow direction of the working fluid through such a turbine engine.

In particular, the description relates to methods of regulating turbine engines that comprise at least a compressor, a combustion chamber downstream from the compressor, first and second turbines downstream from the combustion chamber, a first rotary shaft constrained to rotate at least with said compressor and said first turbine, a second rotary shaft constrained to rotate with the second turbine, the second rotary shaft nevertheless being free to rotate relative to the first rotary shaft, and a regulator for controlling the feed of fuel to the combustion chamber. Such turbine engines are known as "gas turbines" in particular for static applications, as "turboprops" when the second rotary shaft is used to drive a propulsive propeller, or as "turboshaft engines" when mounted on board a vehicle but used to drive a propulsive device other than a propulsive propeller. Thus, turboshaft engines are used in particular for driving the rotary wings of aircraft.

In this field, and more particularly for aircraft turboshaft engines and turboprops, and in particular for turboshaft engines that are to drive rotary wings, an accidental break in the power transmission from the second turbine, or "free" turbine, can lead to the second turbine running away dangerously. In order to avoid more severe damage as a result of such runaway, proposals have been made for the regulator to cut off the feed of fuel to the combustion chamber if the speed of rotation of said second rotary shaft exceeds a maximum threshold.

Setting this maximum threshold nevertheless requires major technical compromises. In certain applications, it is desirable to reach significant overspeeds for the second shaft during certain operating conditions of the engine. Thus, in the field of rotary wing aircraft, this can serve to allow transient peaks in the speed of rotation of the rotary wing in the event of the aircraft performing severe maneuvers. Nevertheless, a high maximum threshold for the speed of rotation of the second rotary shaft also requires significant overdimensioning of the second turbine and of the second rotary shaft compared with the maximum torque that is delivered by the second rotary shaft under stable conditions, in particular maximum continuous power (MCP) conditions or maximum takeoff power (TOP) conditions. Such overdimensioning can normally be achieved only to the detriment of the performance of the engine, and in association with a significant increase in its weight, where such an increase is particularly undesirable in the field of aviation.

Faced with this drawback in multiengine power plants having at least two such engines, one solution proposed in the state of the art is to incorporate a crossed inhibition device in the power plant serving to avoid simultaneously cutting off the feed to both engines as a result of said maximum speed threshold being exceeded by the second rotary shaft. Nevertheless, that solution presents other drawbacks, and in particular in the event of a break in the power transmission downstream from both engines during an accident.

OBJECT AND SUMMARY OF THE INVENTION

The present invention seeks to remedy those drawbacks. In particular, the present description seeks to propose a method of regulating a turbine engine that makes it possible to avoid its free turbine running away dangerously in the event of a break in the power transmission downstream, while nevertheless not constituting an obstacle for voluntary speed peaks, nor requiring excessive overdimensioning of the free turbine or of the power transmission downstream therefrom.

In at least one implementation, this object is achieved by the fact that the maximum threshold for the speed of rotation of the second rotary shaft varies as a function of at least one indicative physical parameter associated with mechanical power being extracted from the combustion gas by the second turbine, said maximum threshold for the speed of rotation of the second rotary shaft being reduced when said indicative physical parameter exceeds a higher threshold and when said indicative physical parameter passes below a lower threshold.

By means of these provisions, this maximum threshold for the speed of rotation of the second rotary shaft can be different for overspeed resulting from a break in the power transmission downstream from the free turbine and for a voluntary and transient excursion of the speed of the free turbine.

Several different physical parameters are associated with the mechanical power being extracted from the combustion gas by the second turbine. Thus, by way of example, the torque transmitted by the second rotary shaft, together with its speed of rotation, has a direct relationship with said power. Thus, by way of example, the indicative physical parameter used in the method may be constituted, by the torque transmitted by the second rotary shaft.

Nevertheless, other physical parameters of the engine can also be associated with the mechanical power being transmitted by the combustion gas to the second turbine. In particular, the speed of the gas generator is also intimately related with this power. Thus, by way of example, the indicative physical parameter used in the method may also be the speed of rotation of the first rotary shaft. Under such circumstances in particular, said maximum threshold for the speed of rotation of the second rotary shaft may specifically vary as a function not only of at least said speed of rotation of the first rotary shaft, but also as a function of an ambient pressure and/or temperature. In particular, the ambient pressure and/or temperature may be used to normalize said speed of rotation of the first rotary shaft in a function for determining said maximum threshold for the speed of rotation of the second rotary shaft.

Other physical parameters associated with the power being extracted from the combustion gas by the second turbine and suitable for use as indicative physical parameters in the method, as an alternative to or in addition to the torque transmitted by the second rotary shaft and/or the speed of rotation of the first rotary shaft, comprise for example: a pressure downstream from said compressor; a temperature downstream from said combustion chamber; a (mass or volume) flow rate of fuel supplied to the combustion chamber; a (mass or volume) flow rate of air passing through said compressor; and/or a movement of a control member for controlling the engine.

Said maximum threshold for the speed of rotation of the second rotary shaft is thus produced when said indicative physical parameter exceeds a higher threshold. Such a reduction in the maximum threshold for the speed of rotation of the second rotary shaft beyond a higher threshold of the indicative physical parameter associated with the mechanical power being extracted from the combustion gas by the second turbine enables the feed of fuel to be cut off sooner following a break in the power transmission downstream from the free turbine, or resulting from a failure in terms of regulating fuel feed that has led to an uncontrolled increase in the speed of the engine. Simultaneously, the higher maximum threshold for the speed of rotation of the second shaft below this higher threshold of the indicative physical parameter makes it possible to accommodate transient overspeeds of the free turbine at low speeds of the gas generator. Nevertheless, below said higher threshold of the indicative physical parameter, a warning may be recorded if the speed of rotation of the second rotary shaft exceeds a warning threshold that is significantly lower than its maximum threshold, e.g. for the purpose of triggering an inspection of the engine after any such transient overspeed.

In addition, said maximum threshold for the speed of rotation of the second rotary shaft may decrease gradually with an increase in said indicative physical parameter between an intermediate threshold for the speed of rotation of the first rotary shaft and its higher threshold, thereby adapting the maximum speed of rotation of the second rotary shaft to the increase in the power being extracted from the combustion gas by the second turbine and being transmitted in normal manner by the second rotary shaft. This makes it possible to optimize the dimensioning of the second turbine and of the second rotary shaft.

Furthermore, below a lower threshold for the indicative physical parameter, overspeed of the second rotary shaft may be indicative of a major failure. In particular, if the torque transmitted by the second rotary shaft is below a certain threshold, overspeed of the second rotary shaft is very likely to have been caused by a break in power transmission downstream from the second rotary shaft. Even if the indicative physical parameter used is some other parameter, an overspeed of the second rotary shaft while below a lower threshold of the indicative physical parameter can indicate a failure in the sensor(s) used in particular for measuring the indicative physical parameter. If the indicative physical parameter associated with the power being extracted from the combustion gas by the second turbine is below this lower threshold, then the second rotary shaft is in overspeed and that might mean, in particular, that the values measured for the indicative physical parameters are not true values. The reduction in said maximum threshold for the speed of the second rotary shaft when said indicative physical parameter goes below its lower threshold makes it possible to maintain a high maximum threshold for the speed of rotation of the second rotary shaft, even though the amount of power being extracted from the combustion gas by the second turbine is in fact uncertain.

The invention also provides a data medium including a set of instructions suitable for being executed by a programmable digital regulator in order to perform such a regulation method. In the present context, the term "data medium" covers any data storage device that can be read by a computer system, and in particular by a processor such as a programmable electronic regulator. Such a data medium may in particular be a magnetic data storage device such as a magnetic disk or tape, an optical data storage device such as an optical disk, or an electronic data storage device such as a volatile or non-volatile electronic memory. The present description thus also provides such a set of instructions as a computer program and a software product.

Furthermore, the invention also provides a turbine engine comprising at least a compressor, a combustion chamber downstream from the compressor, first and second turbines downstream from the combustion chamber, a first rotary shaft constrained to rotate at least with said compressor and said first turbine, a second rotary shaft constrained to rotate with the second turbine, the second rotary shaft nevertheless being free to rotate relative to the first rotary shaft, a circuit for feeding the combustion chamber with fuel, and a regulator for controlling the feed of fuel to the combustion chamber and configured to cut off said feed if a speed of rotation of said second rotary shaft exceeds a maximum threshold. In at least one implementation of this method, said maximum threshold for the speed of rotation of the second rotary shaft varies as a function of at least one indicative physical parameter associated with mechanical power extracted from the combustion gas by the second turbine.

The invention also provides a power plant including at least two such turbine engines, and an aircraft, and in particular a rotary wing aircraft, including at least one such turbine engine, and possibly at least two.

BRIEF DESCRIPTION OF THE DRAWINGS

The invention can be well understood and its advantages appear better on reading the following detailed description of embodiments given as non-limiting examples. The description refers to the accompanying drawings, in which.

DETAILED DESCRIPTION OF THE INVENTION

Figure 1:
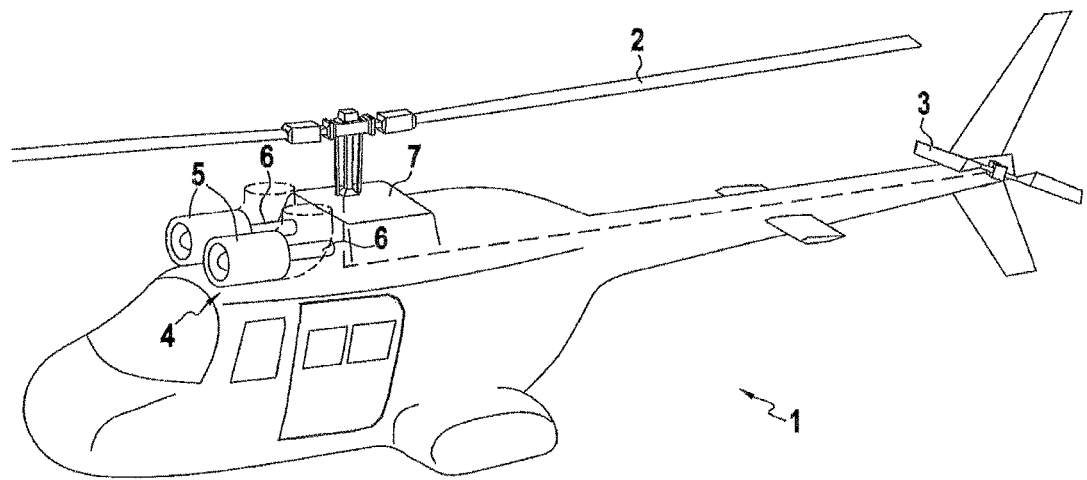
FIG. 1 is a diagrammatic perspective view of a rotary wing aircraft.

The first figure shows a rotary wing aircraft 1, more specifically a helicopter having a main rotor 2 and an antitorque tail rotor 3 that are coupled to a power plant 4 in order to drive them. The power plant 4 shown comprises two turboshaft engines 5. More specifically, these engines 5 are turboshaft engines, each having a power takeoff shaft 6 connected to a main transmission gearbox 7 for driving the main rotor 2 and the tail rotor 3.

Figure 2:
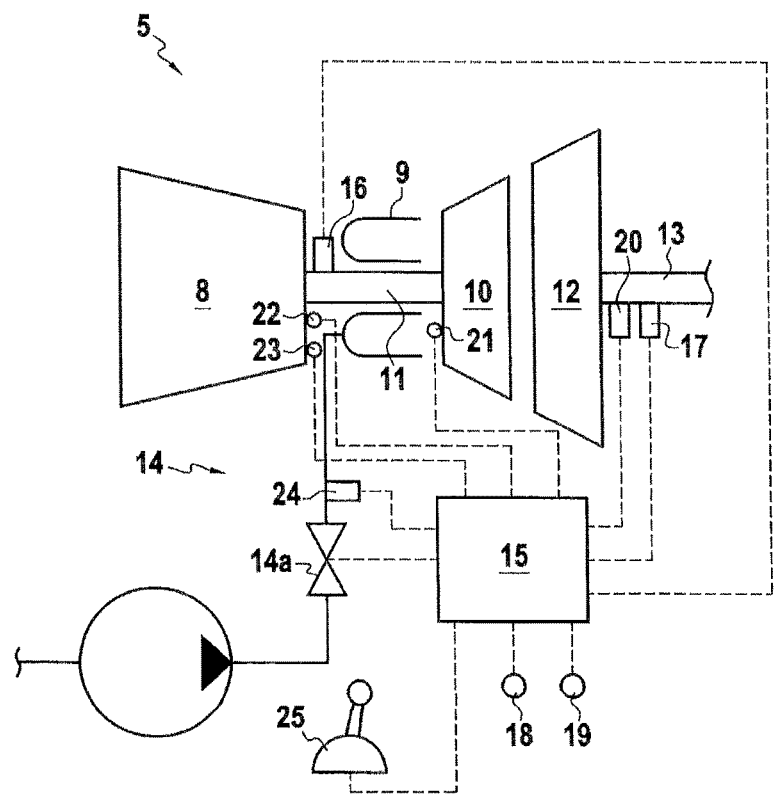
FIG. 2 is a diagrammatic view of a power plant of the FIG. 1 aircraft, having two turboshaft engines.

One of the engines 5 of the power plant 4 is shown in greater detail in FIG. 2. Each engine 5 comprises a compressor 8, a combustion chamber 9, a first turbine 10 connected by a first rotary shaft 11 to the compressor 8, and a second turbine 12, known as a "free" turbine, that is coupled to a second rotary shaft 13 that is coupled in turn to the power takeoff shaft 6. The assembly formed by the compressor 8, the combustion chamber 9, the first turbine 10, and the rotary shaft 11 is also known as a "gas generator". A feed circuit 14 serves to feed the combustion chamber 9 with fuel in each of the gas generators GG. The feed circuit 14 includes at least one valve 14a connected for control purposes to a digital regulator 15, normally of the kind known as full authority digital engine control (FADEC). The regulator 15 may in particular comprise a programmable electronic processor having electronic memory containing a set of instructions for regulating the operation of the engine 5. The regulator 15 is also connected to a set of sensors including in particular a sensor 16 for sensing the speed of rotation of the first rotary shaft 11, a sensor 17 for sensing the speed of rotation of the second rotary shaft 13, sensors 18 and 19 respectively for sensing ambient temperature and pressure, a sensor 20 for sensing twist on the second rotary shaft 13, a sensor 21 for sensing temperature between the combustion chamber 9 and the first turbine 10, sensors 22 and 23 respectively for sensing the pressure and the flow rate of air between the compressor 8 and the combustion chamber 9, and a sensor 24 for sensing the flow rate of fuel delivered to the combustion chamber 9. Finally, the regulator 15 may also be connected to a control lever 25 for actuation by a pilot of the aircraft 1 in order to control the operating speed of each engine 5.

By way of example, the sensor 20 may be a twist torque meter of the kind disclosed in the publications of French patent applications FR 2 972 256 and FR 2 931 552, that measure the torque $M_2$ transmitted by the second rotary shaft by measuring its deformation in twisting. The temperature sensors 18 and 21 may in particular be thermocouples, although the sensor 21 could equally well be a pyrometer, for example. The sensor 24 may be a flow rate measuring spinner, or a sensor for sensing the position of a metering unit in the fuel feed circuit.

Typically, the components of each engine 5 are dimensioned for a clearly defined operating range of the engine 5. In order to optimize the performance of the power plant 4 and of the aircraft 1, it is appropriate to avoid any overdimensioning of the components of the engines 5, and in particular of the rotary parts of the engines 5. Nevertheless, safety must not be compromised. Thus, in order to avoid overspeed that could lead to these rotary parts breaking, and in particular overspeed of the second turbine 12 from which debris could damage other components of the aircraft 1, the regulator 14 is configured in such a manner so as to cut off the fuel feed to the combustion chamber 9 in the event of the speed of rotation $N_2$ of the second rotary shaft 13 as measured by the sensor 17 exceeding a maximum threshold $N_{2,max}$. This configuration may be implemented using instructions stored in the electronic memory of the regulator 15.

In each engine 5, the second turbine 12 and the second rotary shaft 13 may start overspeeding for several different reasons. For example, in the event of the power transmission downstream from the second turbine 12 breaking while the engine 5 is operating at high speed, whether that involves its second rotary shaft 13, the power takeoff shaft 6, or the main transmission gearbox 7, the second turbine 12 is no longer braked by any perceptible resisting torque and it can run away and quickly reach an overspeed that is dangerous. Dangerous overspeed of the second turbine 12 together with the second rotary shaft 13 can also be caused by an uncontrolled increase in speed caused by a failure of the regulator 15. In both situations, overspeed of the second rotary shaft 13 takes place while the gas generator is operating at a high speed.

Furthermore, severe maneuvers can lead to transient overspeeding of the second turbine 12 and of the second rotary shaft 13. By way of example, if the collective pitch of the main rotor 2 is suddenly changed in order to engage autorotation, while the free wheel within the main transmission gearbox 7 seizes or jams and temporarily maintains power transmission between the second turbine 12 and the main rotor 2, the second rotary shaft 13 and the second turbine 12 can be driven into overspeed by the main rotor 2. These transient overspeeds can thus occur at speeds of the gas generator that are significantly lower.

In order to allow such transient overspeeds of the second rotary shaft 13 due to severe maneuvering of the aircraft 1, while also reacting rapidly in the event of overspeed of the second rotary shaft 13 caused by a break in the power transmission downstream from the second turbine 12 or by a malfunction of the regulator 15, in a first embodiment, the maximum threshold $N_{2,max}$ applied to the speed of rotation $N_2$ of the second rotary shaft 13 as measured by the sensor 17 varies as a function of the twist torque $M_2$ as measured by the sensor 20 on the second rotary shaft 13.

Figure 3:
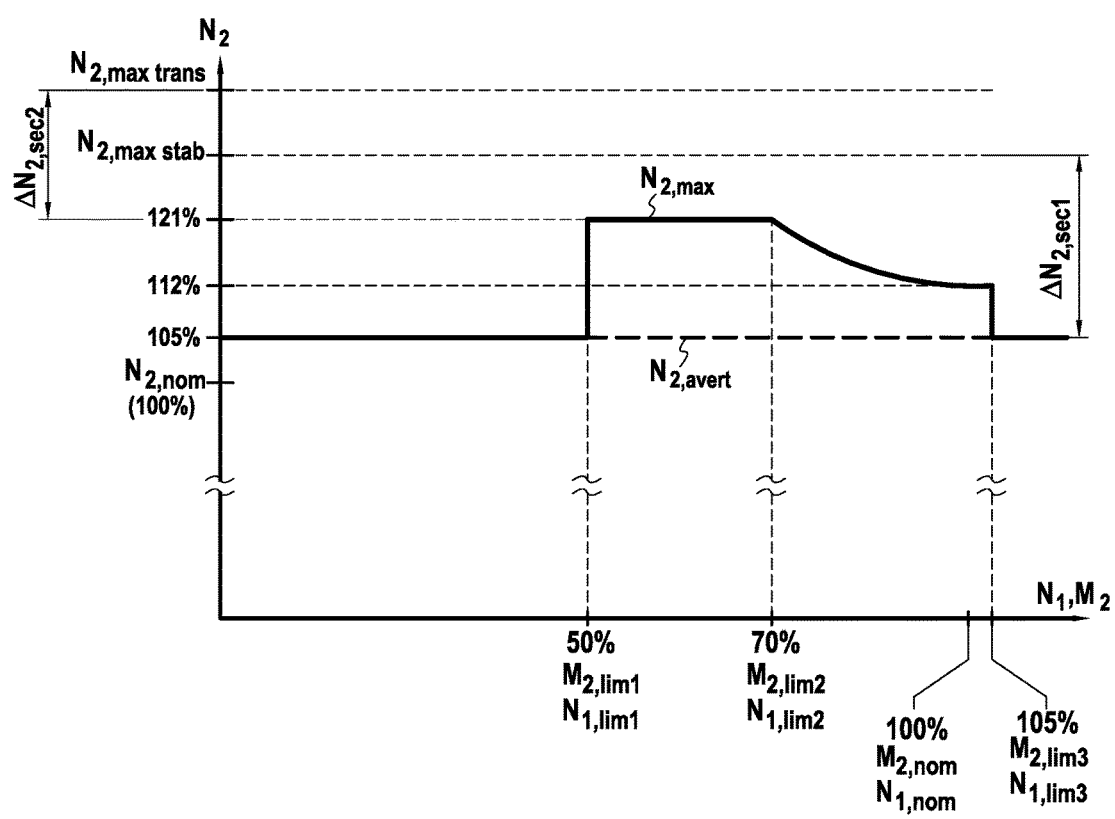
FIG. 3 is a graph showing how a maximum threshold for speed of rotation of a rotary shaft secured to the free turbine of one of the engines of FIG. 2 varies as a function of the torque transmitted by the rotary shaft of the free turbine or as a function of the speed of rotation of a rotary shaft of the gas generator of the same engine.

Thus, as shown in FIG. 3, when the twist torque $M_2$ is greater than a higher threshold $M_{2,lim3}$, the maximum threshold $N_{2,max}$ applied to the speed $N_2$ corresponds to a stabilized maximum speed $N_{2,maxstab}$ that can be reached by the second turbine 12 with this maximum torque $M_{2,lim3}$, minus a first safety margin $\Delta N_{2,sec1}$, whereas when the torque $M_2$ is less than an intermediate torque $M_{2,lim2}$, but still greater than a lower threshold $M_{2,lim1}$, said maximum threshold $N_{2,max}$ applied to the speed $N_2$ presents a value that is significantly higher, corresponding to a maximum transient speed $N_{2,maxtrans}$ reachable by the second turbine 12 with the torque $M_{2,lim2}$, minus a second safety margin $\Delta N_{2,sec2}$.

Between the intermediate threshold $M_{2,lim2}$ and the higher threshold $M_{2,lim3}$ for the torque $M_2$ transmitted by the second rotary shaft 13, the regulator 15 applies a maximum threshold $N_{2,max}$ to the speed $N_2$, which maximum threshold decreases progressively with increasing torque $M_2$.

Furthermore, if the second turbine 12 enters into overspeed while the torque $M_2$ transmitted by the second rotary shaft 3 is lower than a lower threshold $M_{2,lim1}$, that means that there has been a break in the power transmission downstream from the second turbine 12 or that there has been a failure of the sensor 20. Consequently, the maximum threshold $N_{2,max}$ for the speed $N_2$ of the second rotary shaft 13 is reduced. In particular, and as shown in FIG. 3, this maximum threshold $N_{2,max}$ for the speed $N_2$ of the second rotary shaft 13 may be substantially identical for a torque $M_2$ less than its lower threshold $M_{2,lim1}$ and a torque $M_2$ greater than its higher threshold $M_{2,lim3}$.

In addition, the regulator 15 may be configured so as to record a warning when the speed of rotation of the second rotary shaft 13 exceeds a warning threshold $N_{2,avert}$ lower than the maximum threshold $N_{2,max}$ at least when the torque $M_2$ measured on the second rotary shaft 13 lies in the range between its lower threshold $M_{2,lim1}$ and its higher threshold $M_{2,lim3}$. Thus, even if the regulator 15 accepts a large transient overspeed at this speed, it nevertheless records a warning concerning the event, possibly to cause the power plant 4 to be inspected. This recording may be accompanied by a visible or audible warning signal for the attention of the pilot.

In FIG. 3, the torque $M_2$ and the speed of rotation $N_2$ of the second rotary shaft 13 are expressed as percentages respectively of the nominal torque and of the nominal speed of rotation $N_{2,nom}$ and $N_{2,nom}$ expected at nominal full speed. Thus, in the implementation shown, when the torque $M_2$ measured on the second rotary shaft 13 is below a lower threshold $M_{2,lim1}$, e.g. equal to 50% of its nominal full speed torque $N_{2,nom}$, or above a higher threshold $M_{2,lim3}$, e.g. equal to 105% of its torque $M_{2,nom}$ at nominal full speed $N_1$, then, by way of example, the maximum threshold $N_{2,max}$ of its speed of rotation $N_2$ is only 105% of its nominal full speed $N_{2,nom}$. Furthermore, when the torque $M_2$ lies between the lower threshold $M_{2,lim1}$ and an intermediate threshold $M_{2,lim2}$, e.g. equal to 70% of the torque $M_{2,nom}$ at the nominal full speed, then the maximum threshold $N_{2,max}$ of the speed of rotation $N_2$ of the second rotary shaft 13 is substantially higher. By way of example, this maximum threshold $N_{2,max}$ of the speed of rotation $N_2$ of the second rotary shaft 13 may then be 121% of its nominal full speed $N_{2,nom}$, so as to allow transient overspeeds. Beyond the intermediate threshold $M_{2,lim2}$ of the torque $M_2$, the maximum threshold $N_{2,max}$ of the speed of rotation $N_2$ may drop gradually, e.g. down to 112% of its nominal full speed $N_{2,nom}$ at the higher threshold $M_{2,lim3}$. In addition, between the lower threshold $M_{2,lim1}$ and the higher threshold $M_{2,lim3}$ of the torque $M_2$, the regulator 15 is configured to record a warning when the speed of rotation $N_2$ of the second rotary shaft 13 exceeds a warning threshold $N_{2,avert}$ that is less than the maximum threshold $N_{2,max}$ for this range of values for the torque $M_2$. For example, in the implementation shown, the warning threshold $N_{2,avert}$ is 105% of the speed $N_{2,nom}$ of the second rotary shaft 13 at nominal full speed $N_{2,nom}$, i.e. at the same level as the maximum threshold $N_{2,max}$ of the speed of rotation $N_2$ of the second actuator 13 when the measured speed $N_1$ of the first rotary shaft 11 is below its lower threshold $N_{1,lim1}$ or above a higher threshold $N_{1,lim3}$. Each of these numerical values is given purely by way of illustration, and other more appropriate values may be selected for each threshold, e.g. as a function of parameters of the power plant 4 and of the aircraft 1.

Nevertheless, in other implementations, other indicative physical parameters associated with the mechanical power extracted from the combustion gas by the second turbine 12 could be used as an alternative to or in addition to the torque $M_2$.

Thus, in a second implementation, the maximum threshold $N_{2,max}$ applied to the speed of rotation $N_2$ of the second rotary shaft 13 as measured by the sensor 17 varies as a function of the speed of rotation $N_1$ of the first rotary shaft 11 as measured by the sensor 16, and thus as a function of the speed of the gas generator. As shown in FIG. 3, the variation of this maximum threshold $N_{2,max}$ as a function of the speed of rotation $N_1$ of the first rotary shaft 11 as measured by the sensor 16 may be analogous to that as a function of the torque $M_2$ in the first implementation.

Thus, in FIG. 3, the speed of rotation $N_1$ is also expressed as a percentage of the speed of rotation at nominal full speed $N_{1,nom}$ of the first rotary shaft 11, on the same axis as is used for torque $M_2$. When the measured speed $N_1$ of the first rotary shaft 11 is below a lower threshold $N_{1,lim1}$, e.g. equal to 50% of its nominal full speed $N_{1,nom}$ or above a higher threshold $N_{1,lim3}$, e.g. equal to 105% of its nominal full speed $N_{1,nom}$, then, by way of example, the maximum threshold $N_{2,max}$ of the speed of rotation $N_2$ of the second rotary shaft 13 may be only 105% of its nominal full speed $N_{2,nom}$. Furthermore, when the speed $N_1$ of the first rotary shaft 11 lies between the lower threshold $N_{1,lim1}$ and an intermediate threshold $N_{1,lim2}$, e.g. equal to 50% of its nominal full speed $N_{1,nom}$, then the maximum threshold $N_{2,max}$ of the speed of rotation $N_2$ of the second rotary shaft 13 is substantially higher. By way of example, this maximum threshold $N_{2,max}$ for the speed of rotation $N_2$ of the second rotary shaft 13 may then be equal to 121% of its nominal full speed $N_{2,nom}$ so as to allow transient overspeeds. Beyond the intermediate threshold $N_{1,lim2}$ for the speed $N_1$ of the first rotary shaft 11, the maximum threshold $N_{2,max}$ for the speed of rotation $N_2$ of the second rotary shaft 13 may drop gradually, e.g. down to 112% of its nominal full speed $N_{2,nom}$ at the higher threshold $N_{1,lim3}$ so as to take account of the increasing torque transmitted by the second rotary shaft 13. In addition, between the lower threshold and the higher threshold $N_{1,lim3}$ for the speed of rotation $N_1$ of the first rotary shaft 11, the regulator 15 is configured to record a warning when the speed of rotation $N_2$ of the second rotary shaft 13 exceeds a warning threshold $N_{2,avert}$ that is less than the maximum threshold $N_{2,max}$ within this range of speeds $N_1$ of the first rotary shaft 11. For example, as shown, the warning threshold $N_{2,avert}$ is 105% of the speed $N_{2,nom}$ of the second rotary shaft 13 at nominal full speed $N_{2,nom}$, i.e. at the same level as the maximum threshold $N_{2,max}$ for the speed of rotation $N_2$ of the second rotary shaft 13 when the measured speed $N_1$ of the first rotary shaft 11 is below its lower threshold $N_{1,lim1}$ or above a higher threshold $N_{1,lim3}$. Each of these numerical values is given purely by way of illustration, and other, more appropriate values could be selected for each threshold, e.g. as a function of parameters of the power plant 4 and of the aircraft 1.

The curve shown in FIG. 3 thus also reproduces variation in the maximum threshold $N_{2,max}$ of the speed of rotation $N_2$ of the second rotary shaft 13 as a function of the measured speed $N_1$ of the first rotary shaft 11 at unchanging ambient pressure and temperature $p_0$ and $T_0$. Nevertheless, this maximum threshold $N_{2,max}$ can also vary as a function of the ambient pressure and temperature $p_0$, $T_0$ as sensed by the sensors 18, 19. For example, the maximum threshold $N_{2,max}$ for the speed of rotation $N_2$ of the second rotary shaft 13 may be expressed as a function of a normalized speed NG of the gas generator that is expressed as the product of the speed of rotation $N_1$ multiplied by the ambient pressure $p_0$ and divided by the square root of the ambient temperature $T_0$.

Other indicative physical parameters may also be used as an alternative to or in addition to the torque $M_2$ or the speed of rotation $N_1$. Thus, in other implementations, the maximum threshold $N_{2,max}$ may, by way of example, vary as a function of a pressure $p_3$ or of a flow rate $Q_a$ of air as measured by the sensors 22, 23 in the stream of air passing through the engine 5 downstream from the compressor 8, a temperature $T_{45}$ of the combustion gas as measured by the sensor 21 between the combustion chamber 9 and the first turbine 10, a fuel flow rate $Q_c$ as measured by the sensor 24 in the fuel feed circuit, and/or the position of the control lever 25 relative to its neutral position. The variation in the maximum threshold $N_{2,max}$ of the speed of rotation $N_2$ of the second rotary shaft 13 as a function of each of these indicative physical parameters may be analogous to that shown in FIG. 3 as a function of the torque $M_2$ or of the speed $N_1$.

In each of the above-mentioned implementations, the variation in the maximum threshold $N_{2,max}$ as a function of at least one indicative physical parameter may be stored as a map in the regulator 15. This map may in particular be stored on a data medium within the regulator 15 and it may be used by a computer program comprising a series of instructions for performing this method of regulating the engine 5, and possibly also stored on a data medium suitable for being read by a processor of the regulator 15 for this implementation. Nevertheless, the regulator 15 may be of a form other than a programmable digital regulator. Thus, by way of example, it could equally well be a mechanical, fluidic, or electronic regulator using hard-wired logic.

Although the present invention is described with reference to a specific implementation, it is clear that various modifications and changes may be performed on these implementations without going beyond the general scope of the invention as defined by the claims. In addition, individual characteristics of the various implementations described may be combined in additional implementations. Consequently, the description and the drawings should be considered in a sense that is illustrative rather than restrictive.

The invention claimed is:

1. A regulation method for regulating at least one turbine engine that comprises:
   a compressor;
   a combustion chamber downstream from the compressor;
   first and second turbines downstream from the combustion chamber;
   a first rotary shaft constrained to rotate at least with said compressor and said first turbine;
   a second rotary shaft constrained to rotate with the second turbine, the second rotary shaft being free to rotate relative to the first rotary shaft; and
   a regulator for controlling a fuel feed to the combustion chamber;
   wherein said regulator cuts off the fuel feed to the combustion chamber if a speed of rotation of said second rotary shaft exceeds a maximum threshold that varies as a function of at least one indicative physical parameter associated with mechanical power being extracted from a combustion gas by the second turbine, and
   wherein said maximum threshold for the speed of rotation of the second rotary shaft is reduced when said indicative physical parameter exceeds a higher threshold and when said indicative physical parameter passes below a lower threshold.

2. A regulation method according to claim 1, wherein said indicative physical parameter is torque transmitted by the second rotary shaft.

3. A regulation method according to claim 1, wherein said indicative physical parameter is a speed of rotation of the first rotary shaft.

4. A regulation method according to claim 3, wherein said maximum threshold for the speed of rotation of the second rotary shaft varies as a function at least of said speed of rotation of the first rotary shaft, and also as a function of ambient pressure and/or temperature.

5. A regulation method according to claim 1, wherein said indicative physical parameter is a pressure downstream from said compressor.

6. A regulation method according to claim 1, wherein said indicative physical parameter is a temperature downstream from said combustion chamber.

7. A regulation method according to claim 1, wherein said indicative physical parameter is a flow rate of fuel supplied to the combustion chamber.

8. A regulation method according to claim 1, wherein said indicative physical parameter is a flow rate of air passing through said compressor.

9. A regulation method according to claim 1, wherein said indicative physical parameter is a movement of a control member for controlling the turbine engine.

10. A regulation method according to claim 1, wherein, below said higher threshold for said indicative physical parameter a warning is recorded if the speed of rotation of the second rotary shaft exceeds a warning threshold substantially lower than said maximum threshold for the speed of rotation for the second rotary shaft.

11. A regulation method according to claim 1, wherein said maximum threshold for the speed of rotation of the second rotary shaft decreases gradually with an increase in said indicative physical parameter between an intermediate threshold and its higher threshold.

12. A data medium including a set of instructions suitable for being executed by a processor of a programmable digital regulator in order to perform a regulation method according to claim 1.

13. A turbine engine comprising:
   a compressor;
   a combustion chamber downstream from the compressor;
   first and second turbines downstream from the combustion chamber;
   a first rotary shaft constrained to rotate at least with said compressor and said first turbine;
   a second rotary shaft constrained to rotate with the second turbine, the second rotary shaft nevertheless being free to rotate relative to the first rotary shaft; and
   a regulator that controls a fuel feed to the combustion chamber and cuts off said fuel feed if a speed of rotation of said second rotary shaft exceeds a maximum threshold that varies as a function of at least one indicative physical parameter associated with mechanical power being extracted from a combustion gas by the second turbine, and
   wherein said maximum threshold for the speed of rotation of the second rotary shaft is reduced when said indicative physical parameter exceeds a higher threshold and when said indicative physical parameter passes beneath a lower threshold.

* * * * *